United States Patent
Crawford

(10) Patent No.: US 6,270,045 B1
(45) Date of Patent: *Aug. 7, 2001

(54) PERIMETER WELD FLANGES

(75) Inventor: Charles K. Crawford, Wilton, NH (US)

(73) Assignee: Kimball Physics, Inc., Wilton, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/948,816

(22) Filed: Oct. 9, 1997

Related U.S. Application Data

(60) Provisional application No. 60/028,312, filed on Oct. 11, 1996.

(51) Int. Cl.[7] .................................................. A47B 96/06
(52) U.S. Cl. ............................ 248/231.21; 248/231.9; 248/220.21; 285/405; 285/416; 220/584; 403/271
(58) Field of Search ................................. 403/271, 270, 403/335, 336; 285/405, 416, 368, 364, 363, 331, 125.1; 220/584, 581, 601, 661; 29/890.14, 890.141; 248/231.21, 225.11, 226.11, 220.21, 231.9, 363

(56) References Cited

U.S. PATENT DOCUMENTS

| | | | |
|---|---|---|---|
| 1,605,482 | 11/1926 | Taylor | 29/890.14 |
| 2,171,972 | 9/1939 | Debor | 220/584 |
| 2,294,806 | 9/1942 | Samans | 403/336 |
| 2,421,460 | 6/1947 | Merker et al. | 220/581 |
| 3,208,758 | 9/1965 | Carlson et al. | 277/171 |
| 3,632,148 | 1/1972 | Garber | 403/271 |
| 4,239,263 | * 12/1980 | George | 285/150 |
| 4,290,456 | * 9/1981 | Ahrbeck | 138/109 |
| 4,450,613 | * 5/1984 | Ryan et al. | 29/157 |
| 4,472,085 | * 9/1984 | Mohler | 405/255 |
| 4,506,431 | * 3/1985 | Mercier | 29/454 |
| 4,718,637 | * 1/1988 | Contin | 251/158 |
| 4,724,975 | 2/1988 | Leventry | 220/581 |
| 5,593,123 | 1/1997 | Crawford | 248/231.21 |
| 5,625,947 | 5/1997 | Crawford | 29/890.14 |
| 5,660,418 | * 8/1997 | Crawford | 285/125.1 |
| 5,671,956 | * 9/1997 | Crawford | 285/328 |

FOREIGN PATENT DOCUMENTS 115712  6/1941  (AU) ........................................ 220/3

* cited by examiner

Primary Examiner—Ramon O. Ramirez
Assistant Examiner—Kimberly T. Wood
(74) Attorney, Agent, or Firm—Hayes, Soloway, Hennessey, Grossman & Hage, P.C.

(57) ABSTRACT

A perimeter weld flange comprising an inner and external perimeter wall surface and a perimeter weld lip on said flange for welding said flange onto a receiving surface. The perimeter weld flange herein is particularly suitable for weldable metal-gasketed ultra-high vacuum joints, and is also conveniently welded onto tubes, cones, ellipsoids, plates and other shapes, including even irregular shapes, in addition to spheres.

10 Claims, 8 Drawing Sheets

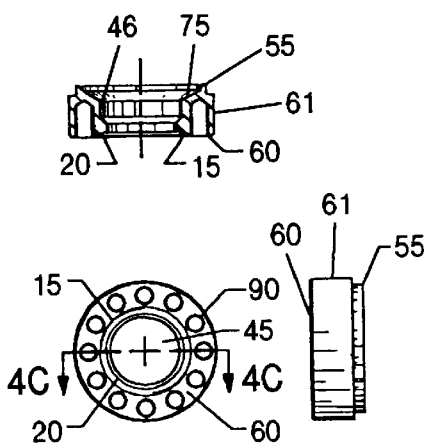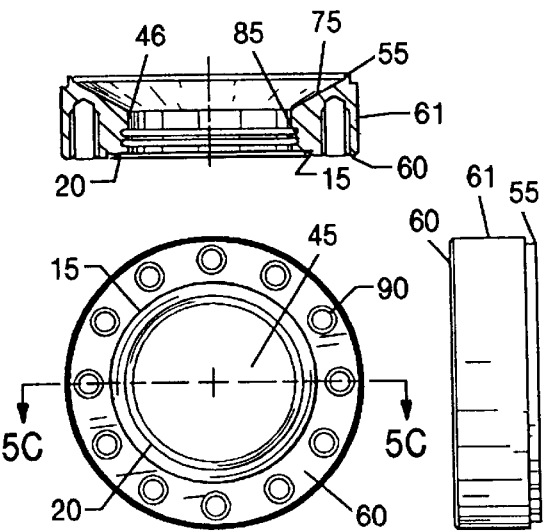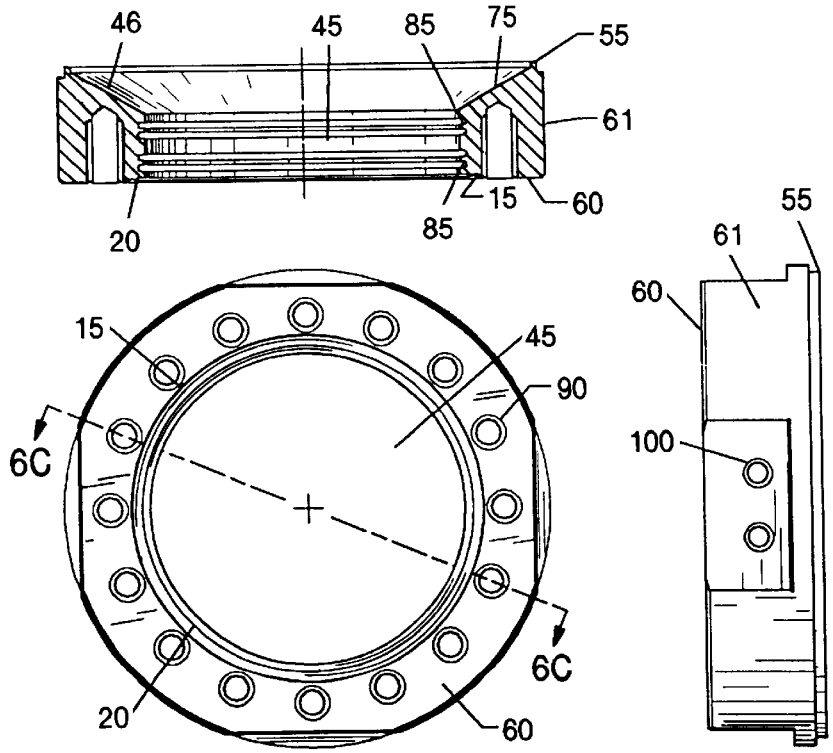

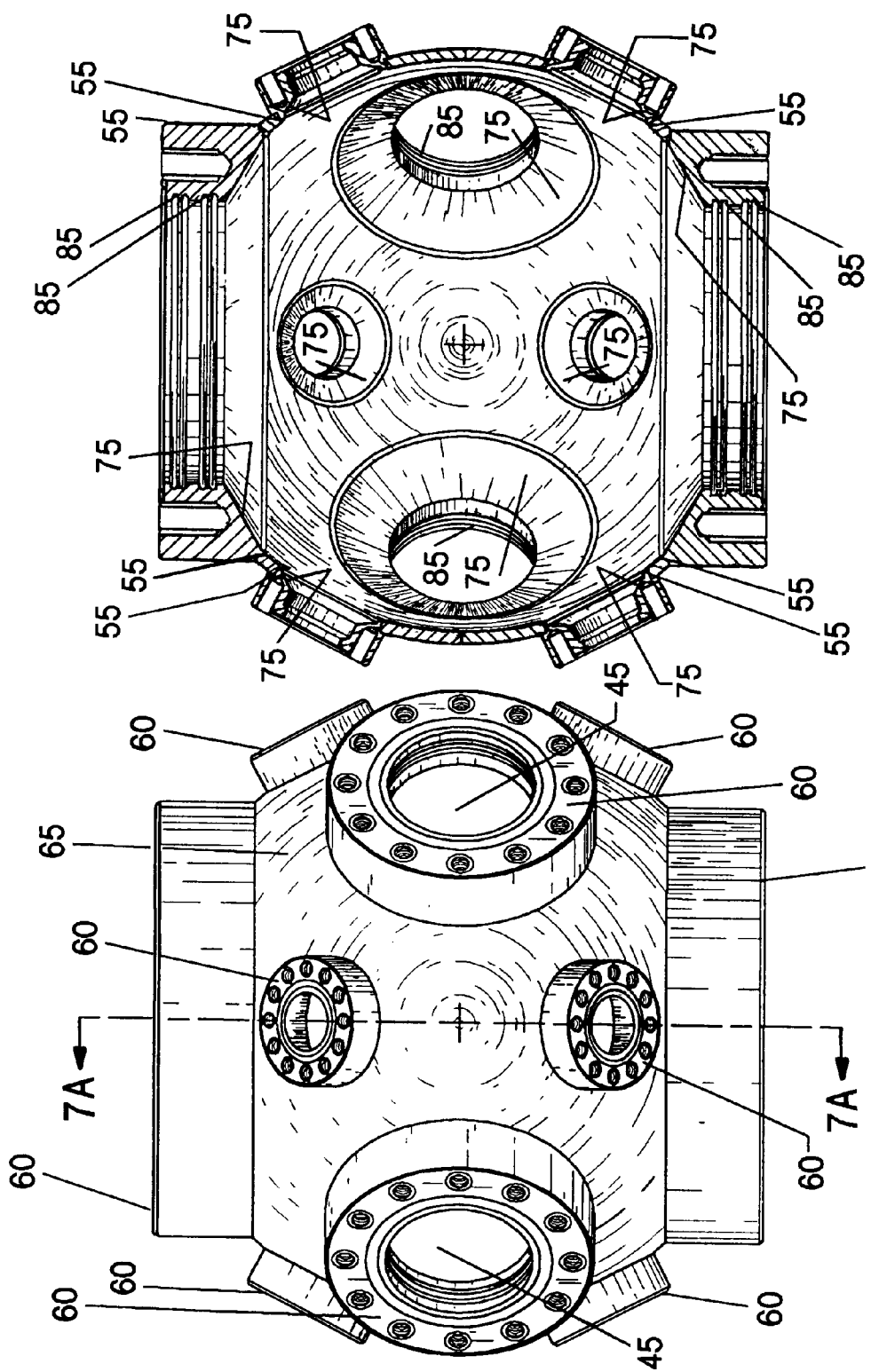

PERIMETER WELD FLANGES

CROSS REFERENCE TO RELATED APPLICATIONS

This application is based upon provisional U.S. patent application Ser. No. 60/028,312 filed Oct. 11, 1996.

FIELD OF THE INVENTION

The present invention relates to an improved flange design for weldable metal-gasketed ultra-high vacuum (UHV) joints. The invention has particular utility with respect to all-metal flanged manifolds and will be described in connection with such utility, although other utilities are contemplated.

BACKGROUND OF THE INVENTION

Vacuum systems are used in scientific research, the semi-conductor industry, many analytical instruments, and various similar applications. Processes or experiments that require high or ultra-high vacuum (UHV) typically employ all-metal vacuum joints or seals. Referring to FIG. 1, such a joint typically comprises a flange 10 that includes an annular recess 15 and an annular knife edge 20. The flange 10 is intended for mating with another like flange 10 separated by a soft, metallic gasket 25. The opposing knife edges 20 are pressed into the gasket 25 by tightening bolts (not shown) forming the UHV seal, e.g. in accordance with the teachings of U.S. Pat. No. 3,208,758. Non-metal gaskets may be used in certain applications. Most embodiments utilize circular flanges; however, the flanges do not need to be circular.

Prior art flanges 10, seen in FIGS. 2A–2C and 3A and 3B, utilize a stepped internal diameter 30, and weld easily only to tube 35 or to tube-like projections machined onto another shape 40. Frequently, an extension tube 35 is welded into a cylindrical main vacuum chamber 70 and a flange 10 is welded onto the extension tube 35. The weld between the extension tube 35 and the cylindrical main chamber 70 is a difficult, non-planar weld which can cause inaccuracy in the flange's positioning. For spherical main chambers 65 and centered flange ports 10 the weld is a simple planar weld, but an extension tube 35 is still required. The extension tube 35 moves the port opening away from the surface of the sphere which interferes with the access and visibility of the interior of the main chamber. Also, the weld of the extension tube 35 to the interior of the flange 10 decreases the possible working diameter of the flange's bore 45, and can only be accessed from the interior of the chamber for smaller sized flanges. This requires that at least one port on the chamber be large enough to accommodate a welding torch, restricting the minimum size of the chamber.

OBJECTS OF THE INVENTION

It is an object of the present invention to provide a flange which overcomes the aforesaid and other disadvantages of the prior art. Another object of the invention is to provide an improved flange design and method of attaching a flange to a receiving shape.

SUMMARY OF INVENTION

The present invention provides a perimeter weldable flange design comprising a weld lip surrounding said flange, in which a hole of diameter equal to the weld lip diameter is machined into the receiving shape, and the flange attached thereto by a weld made on the interior surface of the receiving shape, i.e. the surface exposed to vacuum. With proper tooling, this interior surface weld can be performed readily though the bore of the flange from the outside.

BRIEF DESCRIPTION OF DRAWINGS

Still other objects and advantages of the present invention will be apparent from the following detailed description taken in conjunction with the following drawings, in which like numerals depict like parts, and wherein:

FIG. 4A is a front elevation, 4B a side elevation, and 4C a sectional view of one form of flange made in accordance with the present invention;

FIG. 5A is a front elevation, 5B a side elevation, and 5C a sectional view of another form of flange made in accordance with the present invention;

FIG. 6A is a front elevation, 6B a side elevation, and 6C a sectional view of yet another form of flange made in accordance with the present invention;

FIG. 7A is a front elevation and 7B a sectional view of a spherical chamber with welded flanges made in accordance with the present invention;

DESCRIPTION OF PREFERRED EMBODIMENTS

Figure 1:
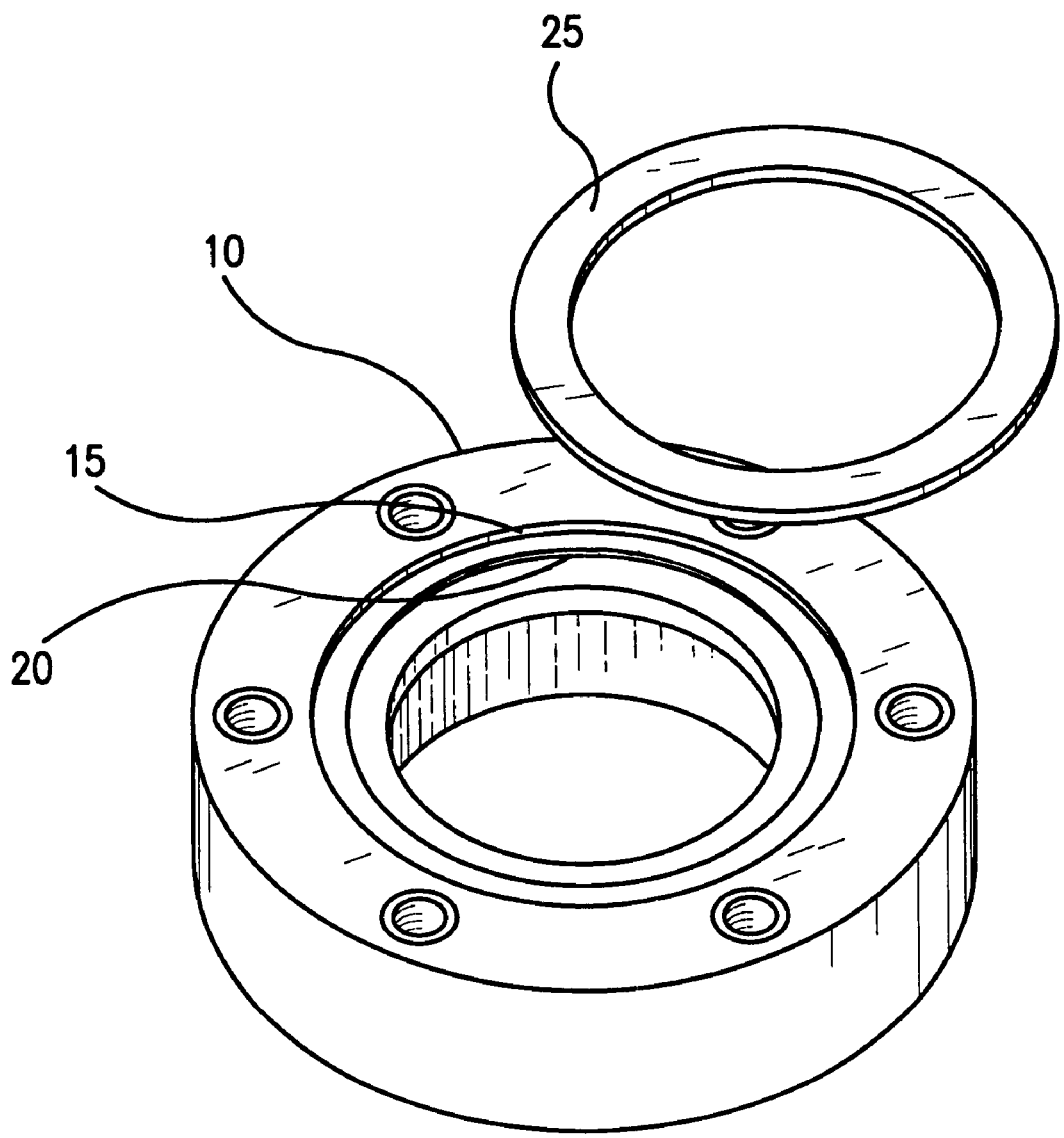
FIG. 1 is an exploded view of a prior art flange and metal gasket.
Figure 2A:
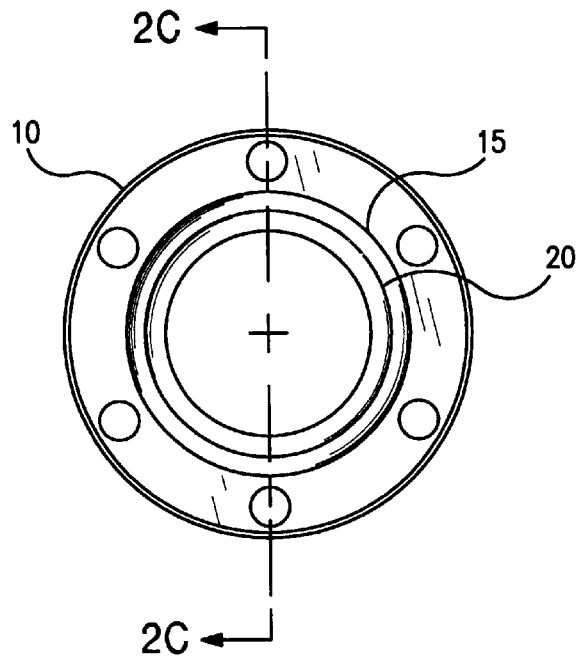
FIG. 2A is a front elevation, 2B a side elevation and 2C a sectional view of a prior art flange welded to an extension tube.
Figure 2C:
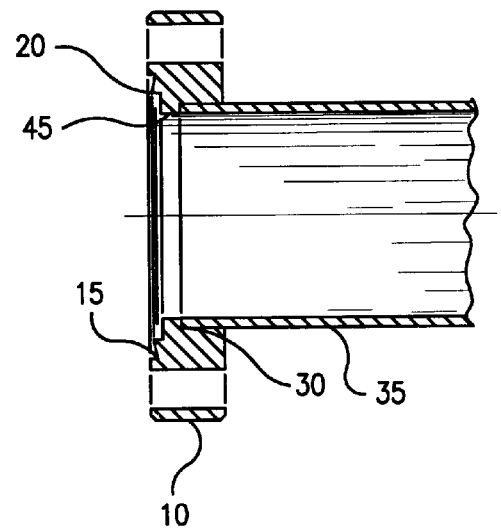
Figure 2B:
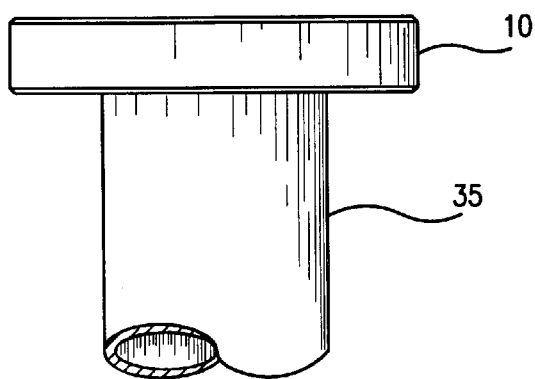
Figure 3B:
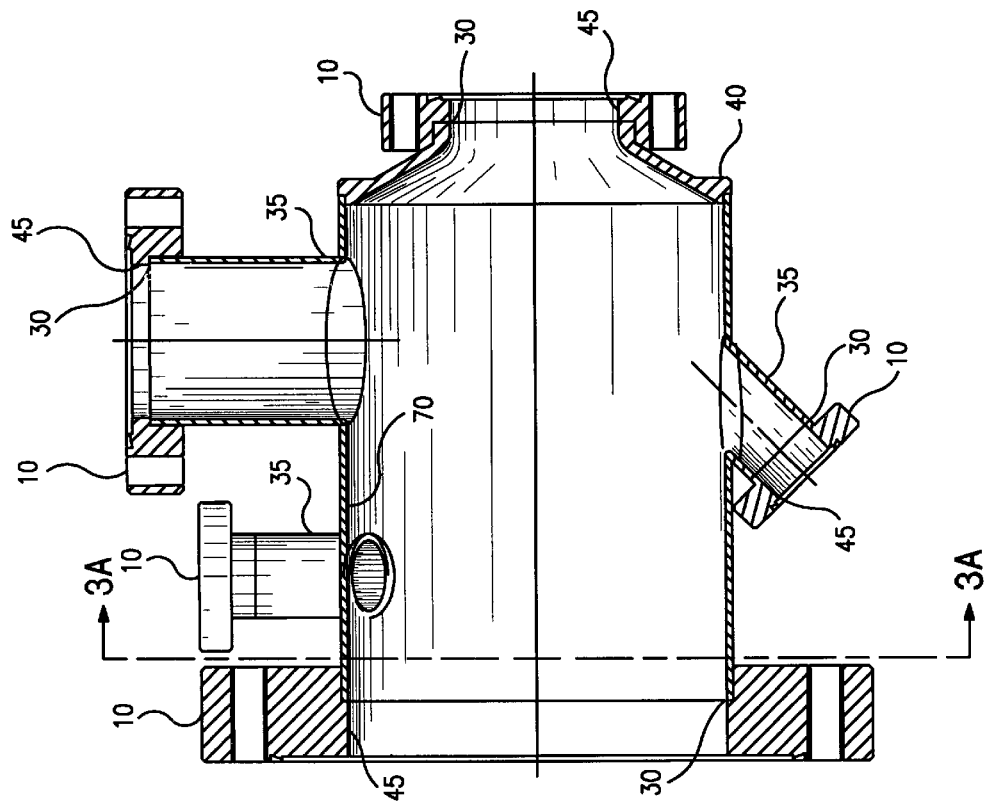
FIGS. 3A and 3B are sectional views of all-metal seal flanges welded to tubes and a cylindrical chamber utilizing the prior art methodology.
Figure 3A:
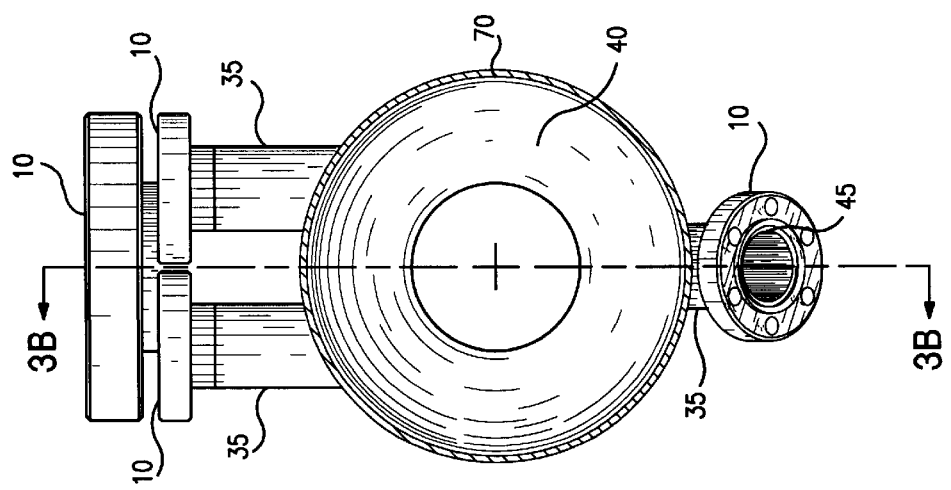

Referring to FIGS. 4A–4C and 7A and 7B, an all-metal seal flange 60 made in accordance with the present invention is shown welded on a spherical chamber 65. The flange 60 preferably includes an internal conical region 75 shaped and dimensioned to mate with the inside surface of spherical chamber 65, or a raised conical region formed thereon. Flange 60 also includes a cylindrical bore 45 between the knife edge seal region 20 and the conical region 75. Referring to FIGS. 5A–5C, if desired, circumferential grooves 85 may be formed in the inner side wall surface of bore region 45 for accommodating mounting systems for devices or accessories as disclosed in U.S. Pat. No. 5,593,123 to Crawford.

Referring also to FIGS. 6A and 6B, if desired, extra gasket compression holes 90 and accessory mounting bolt holes 100 may be provided in the flange.

The weldable flange construction of the present invention offers several advantages over prior art weldable flange constructions. For one, the flange sealing surface of the welded-in flange 60 lies close to the original surface of the spherical chamber 65. In addition, the need for a length of tube separately welded to the chamber and to the corresponding flange such as illustrated in prior art FIGS. 2A–2C and 3A and 3B is eliminated. The internal conical region 75 of the present invention also provides additional internal space, a larger useful bore, and improved access as compared with prior art weldable flange assemblies. Thus, a vacuum joint assembly made in accordance with the present invention may be made much more compact than prior art systems.

Additionally, the total number of welds is reduced. Also, with reference to FIGS. 7A and 7B, internal welds onto spherical chambers, plates, cone ends and cylinder ends are planar and thus easier to make than non-planar welds as in the traditional, cylindrical-wall welds with the prior art flange. Also, internal, i.e. vacuum-side welds, made in accordance with the present invention, are inherently cleaner. The flange can be welded at any arbitrary angle into the receiving shape. And, assembly and accurate positioning of the flange on the receiving shape is easier due to the shape of self-locating weld lip 55. Welded flange assemblies made in accordance with the present invention are shorter in length than prior art welded flange assemblies, which translates into higher pumping conductance and thus ease of achieving vacuum, and also easier hand and tool access. Additionally, easier access with shallow angles makes internal surfaces easier to clean.

The perimeter weld flange allows advantage to be taken of the inherent superiorities associated with spherical shapes. Practical production methods are available for producing hemispherical shells which can be welded together to form a sphere. Spherical chambers combined with perimeter weld flanges provide a maximized internal apparatus capacity for same size series of flanges. The result herein is therefore a vacuum assembly with much improved access for particle and/or photon beams, feedthroughs, manipulators, gauges, valves, pumps, etc. where the completed apparatus is less awkward and much more compact.

Figure 8C:
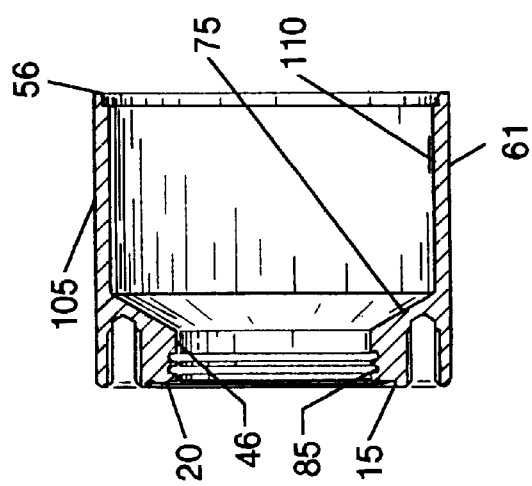
FIG. 8A is a front elevation, and 8B and 8C sectional views of an alternative form of a flange made in accordance with the present invention.
Figure 8A:
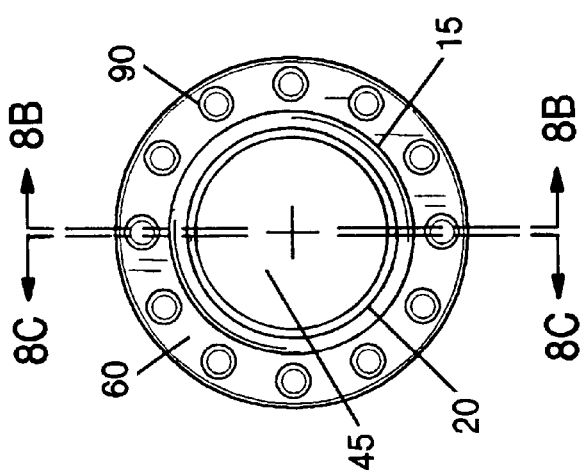
Figure 8B:
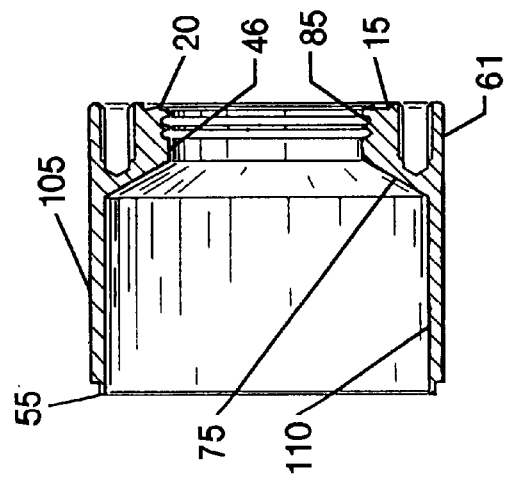

The invention is susceptible to modification. For example, FIGS. 8A–8C illustrate a perimeter weld flange 60 including the conical region 75 where the weld lip 55 is extended backwards for a length, forming a larger-diameter unitary extension 105. The unitary extension 105 serves the function of a tube extension eliminating one weld, and significantly increases the extension inner diameter 110 over the prior art flange 10 with its extension tube 35 of FIGS. 2A–2C and 3A and 3B. Also, the unitary extension 105 can be machined to any profile and could therefore be welded to any shape. Finally, unitary extension 105 on one flange allows a perimeter weld flange 60 of the first embodiment to be welded to the opposite end, forming a single weld cylindrical chamber of any length with maximized internal volume, and improved pumping speed.

Figure 9B:
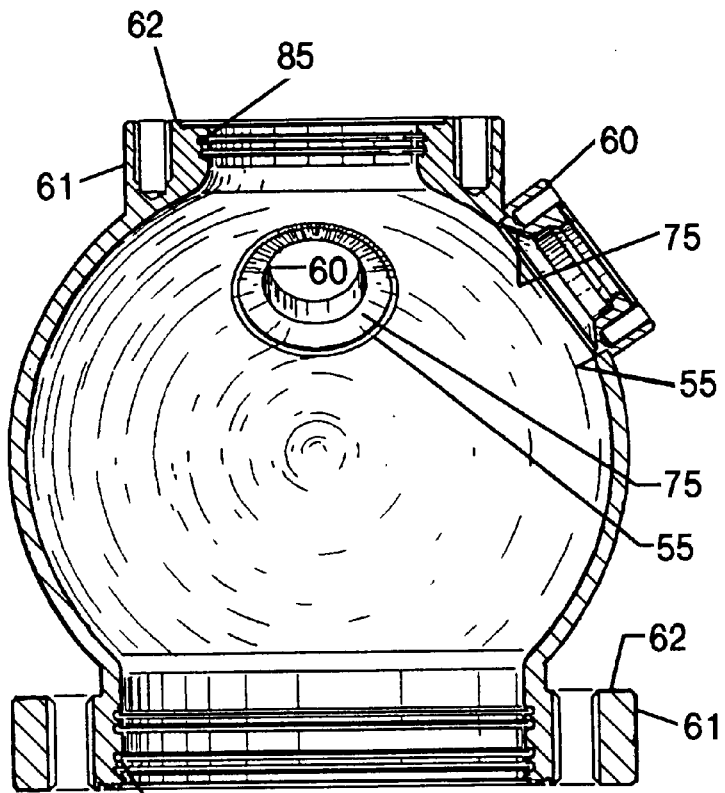
FIG. 9A is a front elevation and 9B a section view of a spherical chamber with welded flanges made in accordance with yet another embodiment of the present invention.
Figure 9A:
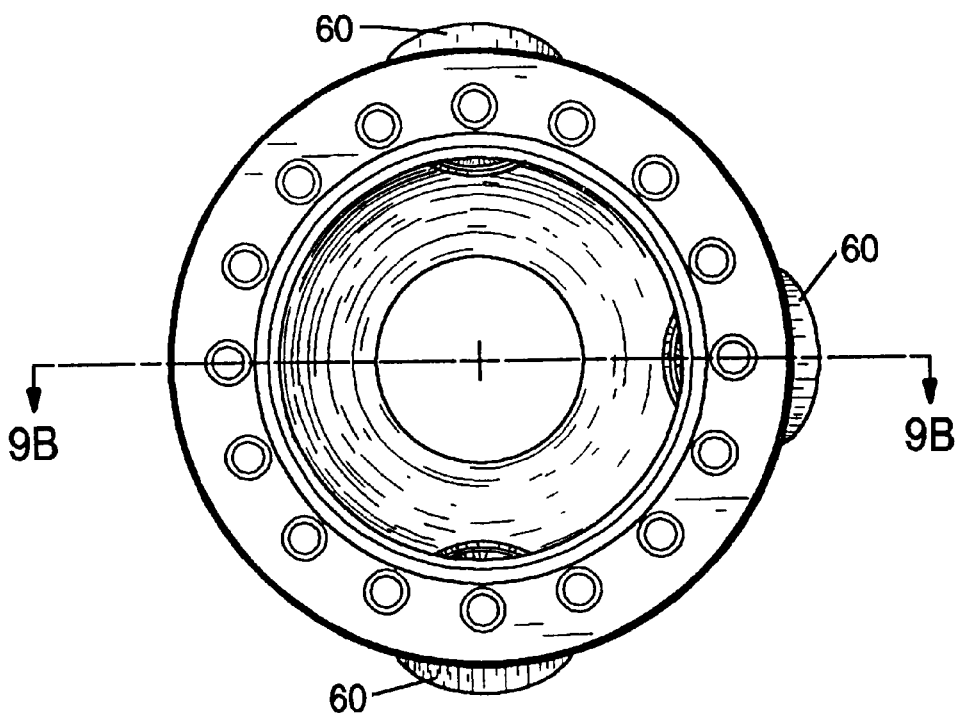

In another modification, with reference to FIGS. 9A and 9B, flanges 62 may be machined directly onto a spherical shell 65, e.g. in accordance with the teachings of U.S. Pat. No. 5,625,947 to Crawford. For a spherical shell 65 with at least one protruding boss, such as the outer diameter of the machined in flange 61, it is easier to machine on a lathe than a solitary spherical shell. With one flange machined directly into a spherical shell 62, other flanges 60 can still be easily added at arbitrary angles by previously stated methods.

Figure 10A:
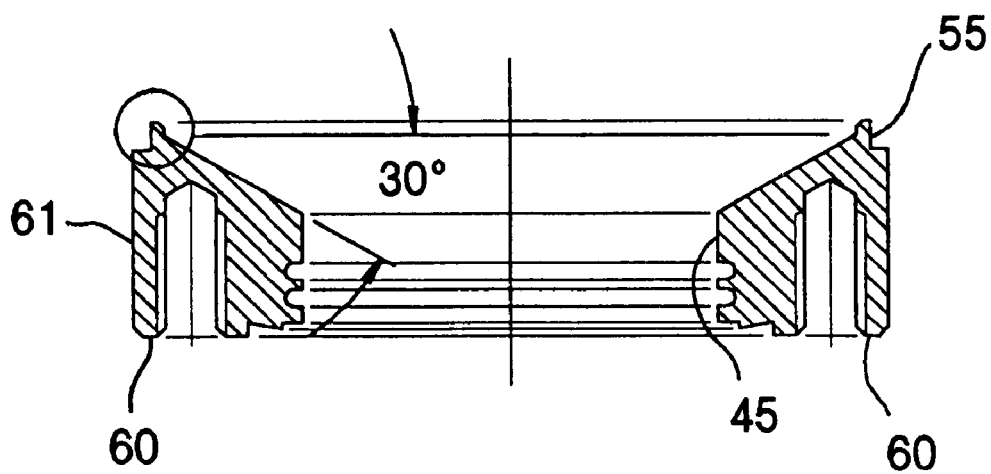
FIG. 10A is yet another sectional view of the form of flange of the present invention.

Finally, as shown in FIG. 10A, the perimeter weld flange of the present invention typically has the following dimensions (inches) for the indicated features:

| Actual OD<br>DIM A | Weld Lip OD<br>DIM B | Weld Lip ID<br>DIM C | Overall Length<br>DIM D |
| --- | --- | --- | --- |
| 1.330 | 1.200 | 1.100 | 0.490 |
| 2.730 | 2.599 | 2.500 | 0.790 |
| 4.470 | 4.430 | 4.240 | 1.090 |
| 5.970 | 5.840 | 5.740 | 1.090 |
| 7.970 | 7.840 | 7.740 | 1.090 |

Figure 10B:
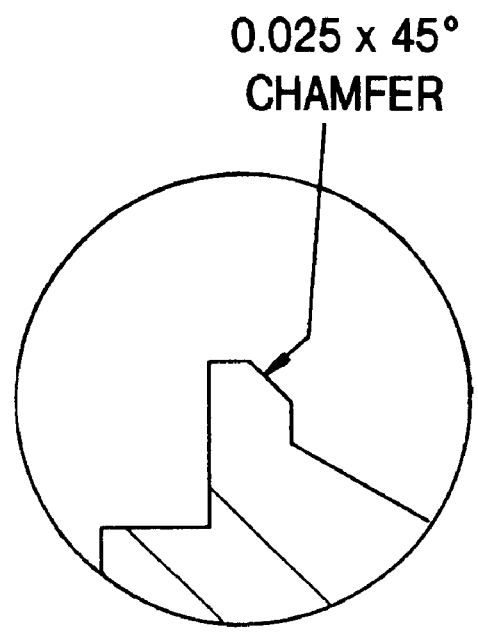
FIG. 10B is an enlarged view of the perimeter weld lip.

In addition, as shown in FIG. 10B, the typical chamfer on the weld lip is 0.025"×45° and the typical weld lip height is about 0.050". Other dimensions can be used.

The present invention provides a method for welding a flange to a receiving surface, by first supplying a perimeter weld flange 60 containing both interior 46 and external perimeter surfaces 61 defining a bore 45, including an external perimeter weld lip 55, and welding the perimeter weld lip 55 of the flange to the receiving surface. In addition, as noted earlier, a preferred embodiment is to weld the perimeter weld flange 60 herein onto spherical vacuum chambers 65, wherein the chamber contains a hole of diameter equal to the weld lip diameter, wherein the weld lip diameter is reference to the outer most diameter of the weld lip 55. In addition, attachment by a weld is conveniently made on the interior surface of the chamber 50, which is the surface exposed to vacuum, by welding tooling positioned within the bore of the flange 45.

Still other changes may be made without departing from the spirit and scope of the invention.

What is claimed is:

1. An all-metal vacuum manifold comprising a metal body defining a hollow having an interior vacuum side surface and a spherical exterior surface, said manifold having at least two branch ports extending between the interior surface and the exterior surface, and a hollow flange attached at a perimeter weld lip to said manifold at said each port by a weld formed on the vacuum side of the manifold bridging each perimeter weld lip of said hollow flange and the interior surface of said metal body.

2. The all-metal vacuum manifold of claim 1, wherein said perimeter weld lip comprises a planar region.

3. The all-metal vacuum manifold of claim 1, wherein said manifold inner wall surface comprises an internal conical region.

4. The all-metal vacuum manifold of claim 1, wherein said hollow body comprises a spherical chamber.

5. The all-metal vacuum manifold of claim 1, wherein said hollow flange includes gasket compression holes.

6. The all-metal vacuum manifold of claim 1, wherein said hollow flange includes accessory mounting bolt holes.

7. The all-metal vacuum manifold of claim 1, wherein said weld lip is extended backwards for a length, forming a larger-diameter unitary extension.

8. A method for welding a hollow metal flange having a weld lip at one end thereof to a hollow all-metal vacuum manifold body, said hollow metal body having an interior vacuum side surface and a spherical exterior surface, and having at least two branch ports extending between the interior surface and the exterior surface, comprising locating said hollow flange in each said port with a perimeter weld lip adjacent the hollow metal body interior surface, and welding each said perimeter weld lip of said flange to the interior vacuum side surface of said metal body.

9. The method claim 8, wherein said hollow body comprises a spherical chamber, and said port comprises a hole formed therethrough of diameter equal to the weld lip diameter.

10. A The method of claim 8, wherein said perimeter weld lip is welded to said hollow body interior surface by welding tooling operatively positioned within the bore of the flange.

\* \* \* \* \*